US010243756B2

(12) United States Patent
Magielse et al.

(10) Patent No.: US 10,243,756 B2
(45) Date of Patent: Mar. 26, 2019

(54) LIGHTING CONTROL

(71) Applicant: SIGNIFY HOLDING B.V., Eindhoven (NL)

(72) Inventors: Remco Magielse, Tilburg (NL); Dzmitry Viktorovich Aliakseyeu, Eindhoven (NL); Jonathan David Mason, Waalre (NL); Sanae Chraibi, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 209 days.

(21) Appl. No.: 14/847,416

(22) Filed: Sep. 8, 2015

(65) Prior Publication Data

US 2016/0072639 A1 Mar. 10, 2016

(30) Foreign Application Priority Data

Sep. 8, 2014 (EP) .................................. 14183950

(51) Int. Cl.
*H04L 12/28* (2006.01)
*G05B 19/042* (2006.01)
*H05B 37/02* (2006.01)

(52) U.S. Cl.
CPC ........ *H04L 12/2816* (2013.01); *G05B 19/042* (2013.01); *H05B 37/0227* (2013.01); *H05B 37/0272* (2013.01); *G05B 2219/23027* (2013.01)

(58) Field of Classification Search
CPC .............. H04L 12/2816; G05B 19/042; G05B 2219/23027; H05B 37/0227; H05B 37/0272

USPC .......................................................... 700/275
See application file for complete search history.

(56) References Cited

U.S. PATENT DOCUMENTS

| 7,307,542 | B1 | 12/2007 | Chandler et al. |
| 7,953,327 | B2 | 5/2011 | Pereira et al. |
| 8,248,467 | B1 | 8/2012 | Ganick et al. |
| 2006/0100782 | A1 | 5/2006 | Levi et al. |
| 2009/0284366 | A1* | 11/2009 | Haartsen ................... G01S 1/70 340/531 |
| 2010/0198367 | A1* | 8/2010 | Petricoin, Jr. ......... G01S 5/0018 700/17 |
| 2010/0289643 | A1* | 11/2010 | Trundle ................. G08C 19/16 340/545.1 |
| 2011/0224925 | A1* | 9/2011 | Tsubata .................... G01C 5/06 702/60 |

(Continued)

FOREIGN PATENT DOCUMENTS

| CN | 101138279 A | 5/2008 |
| CN | 102714907 A | 3/2012 |

(Continued)

*Primary Examiner* — Robert E Fennema
*Assistant Examiner* — Jigneshkumar C Patel
(74) *Attorney, Agent, or Firm* — Meenakshy Chakravorty

(57) ABSTRACT

Apparatus comprising: a transmitter for controlling one or more luminaires which illuminate at least part of an environment occupied by a user; and a controller configured to provide control functionality for controlling the luminaires via the transmitter; wherein the controller is configured to receive an altitude measurement from an altimeter disposed about the user's person, and based thereon to provide said control functionality in dependence on an altitude of the user relative to an altitude of each of the luminaires.

17 Claims, 3 Drawing Sheets

(56) References Cited

U.S. PATENT DOCUMENTS

| | | | | |
|---|---|---|---|---|
| 2012/0289251 A1* | 11/2012 | Moton, Jr. | ............... | H04L 41/12 |
| | | | | 455/456.1 |
| 2013/0026224 A1 | 1/2013 | Ganick et al. | | |
| 2013/0325385 A1 | 12/2013 | Shin et al. | | |
| 2014/0327364 A1 | 11/2014 | Bischof et al. | | |
| 2015/0198938 A1* | 7/2015 | Steele | ................... | G05B 15/02 |
| | | | | 700/275 |
| 2015/0249907 A1* | 9/2015 | Gupta | ................... | H04W 4/043 |
| | | | | 455/456.1 |
| 2015/0292885 A1 | 10/2015 | Sasaki | | |
| 2015/0327010 A1* | 11/2015 | Gottschalk | .............. | G06F 17/50 |
| | | | | 455/456.1 |
| 2016/0037332 A1* | 2/2016 | Egeler | ................... | G08C 17/02 |
| | | | | 455/420 |

FOREIGN PATENT DOCUMENTS

| | | | |
|---|---|---|---|
| JP | 2014157103 A | 8/2014 | |
| WO | 2008104927 A2 | 9/2008 | |
| WO | 2013179175 A1 | 12/2013 | |

\* cited by examiner

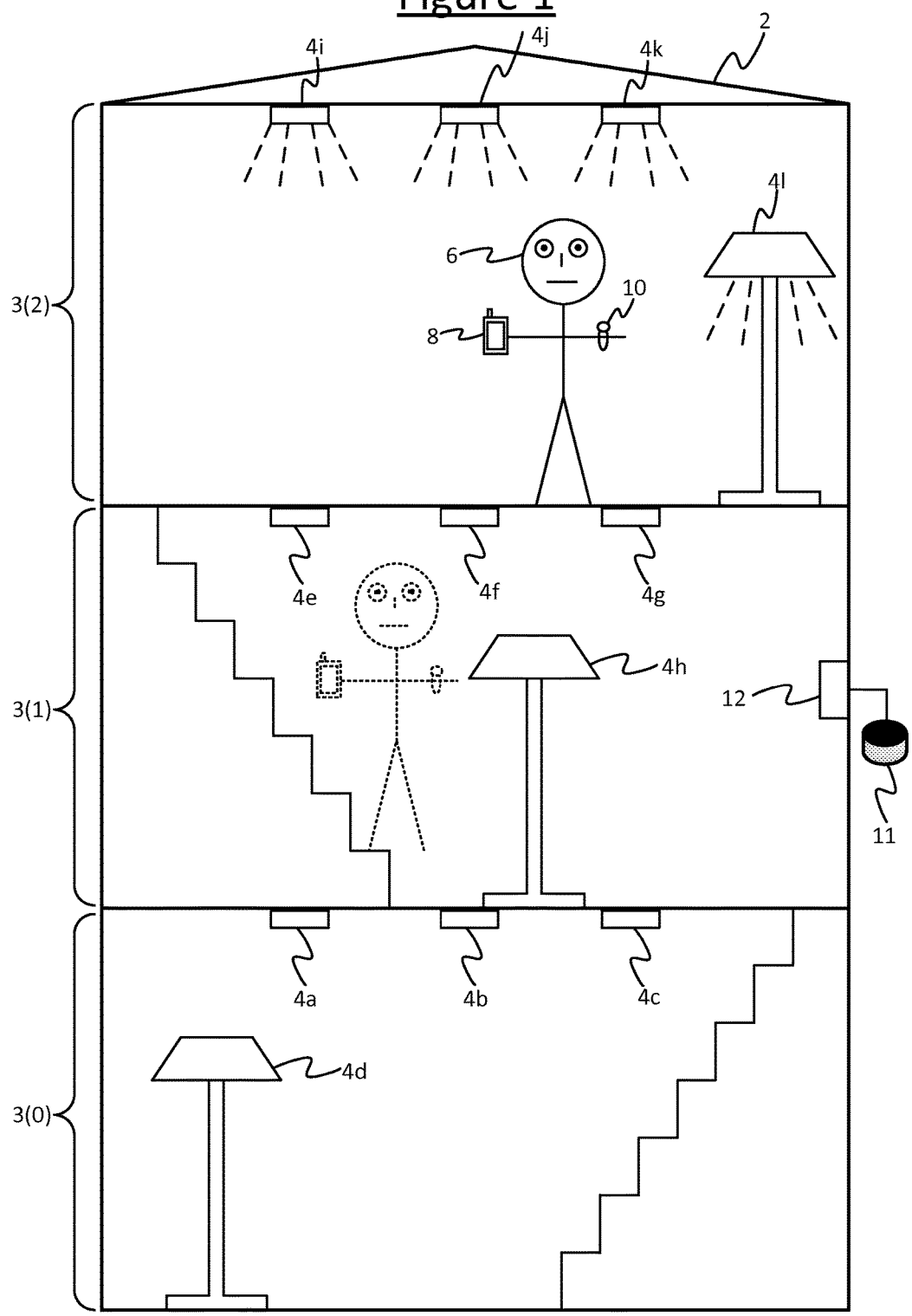

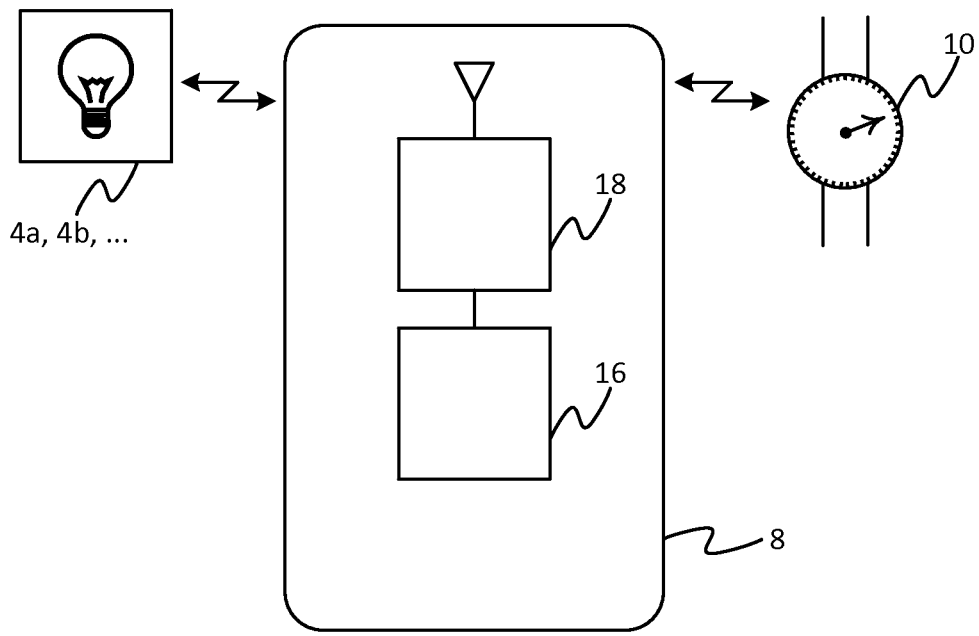
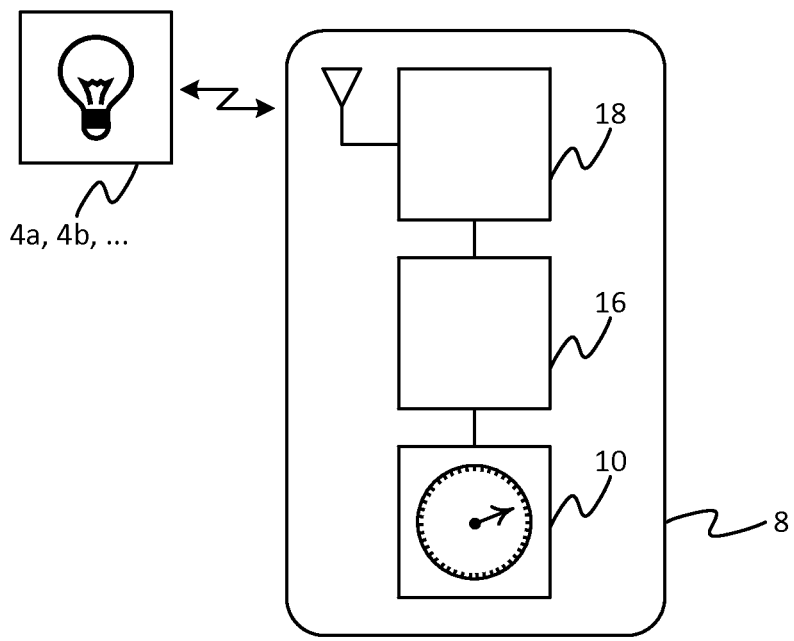

LIGHTING CONTROL

TECHNICAL FIELD

The present disclosure relates to techniques for controlling one or more luminaires which are arranged to illuminate at least part of an environment occupied by a user, and/or one or more household or office appliances available in such an environment.

BACKGROUND

A number of techniques exist for controlling one or more luminaires illuminating a building or other environment, e.g. in order to switch the lights on and off, dim the light level up and down, set a color setting of the emitted light, or request status information from a lighting device.

One technique is to use an application running on a user terminal such as a smartphone, tablet, or laptop or desktop computer. A wired or wireless communication channel is provided between the user terminal and a control unit of the lighting device(s), typically an RF channel such as a Wi-Fi, ZigBee or Bluetooth channel in the case of a mobile user terminal. The application is configured to use this channel to send lighting control requests to the control unit, based on user inputs entered into the application running on the user terminal. In order to determine which luminaire or luminaires are to be controlled, the user selects the desired luminaire(s) from a list presented by the application.

In another example, the application is able to use an inbuilt camera of the user terminal (e.g. rear-facing smartphone camera) to detect coded light signals embedded into the light emitted by the luminaires (i.e. modulated into the light at a frequency high enough to be substantially imperceptible to humans). Based on this technology, each of the luminaires in the system in question is arranged to emit light embedded with a different respective ID (e.g. different code or modulation frequency) that is unique within the system. The user can then point the camera towards the luminaire(s) or scene he or she wishes to control, and the application automatically determines the identity of the relevant luminaires based on the embedded IDs detected in light captured by the camera.

Another technique is to provide an indoor location network to detect when the user is present in a particular zone, e.g. in a particular room. An indoor location network involves a plurality of anchor nodes being installed at various locations throughout the building, each of which (in a device centric approach) emits a beacon signal to be detected by the user's mobile user terminal, or (in a network centric approach) listens for a beacon signal emitted by the mobile terminal. Measurements of these signals such as the received signal strength (e.g. RSSI) or time of flight (ToF) can then be used to determine a current location of the user. When the user performs a user input to control the lights, e.g. to turn on or dim the lights, then the system only controls those luminaires in the room or zone where that user is detected.

Other techniques provide systems for automatically controlling the lights in a building, i.e. rather than requiring an explicit user input from the user. These involve detecting the presence of a user by means of a presence infrastructure or location network, and then automatically turning on or dimming up the lights in any zone where a user is detected to be present, and automatically turning off or dimming down the lights in any zone where a user is not detected to be present. For instance a presence sensor such as a passive infrared (PIR) sensor or active ultrasound sensor may be installed in each room of a building in order to detect whether a user is present in that room, and the luminaires in the respective room may be automatically triggered whenever user presence is detected, timing out after no presence is detected for a certain period.

SUMMARY

All of the above techniques either have the potential to become unwieldy for the user, or require a significant amount of infrastructure to be installed throughout the environment in question (e.g. the building).

In the case where the user selects the luminaire to be controlled from a list, then with the increasing number of connected luminaires in residential or office settings or the like, controlling each luminaire individually can become complex and time-consuming due to the large number of luminaires that the user can control. The controls for the most relevant luminaires may be obscured by the large number of options, and the user has to scroll or navigate through many options before finding the control for the desired luminaire.

In the case where the luminaires to be controlled are identified based on coded light, this may still be unnatural for the user in that it requires the user to hold up his or her smartphone or tablet camera to the lights, which may not be an action that the user is familiar or comfortable with. Also, not all smartphone and tablet cameras are capable of detecting coded light, and nor are all luminaires necessarily equipped to emit coded light.

In the case where indoor location or presence detection is used, this requires a significant amount of infrastructure to be installed, which may be complex, time-consuming and costly. Furthermore, the infrastructure may be quite power-hungry, e.g. in the case of an indoor location network in which beacon nodes continually emit beacon signals at all times, or in the case of other active sensing modalities such as active ultrasound sensors which emit continual ultrasound pulses.

It would be desirable to find an alternative technology for use in controlling one or more luminaires, either to solve one or more of the above problems or otherwise. Similar considerations could also apply not just to lighting, but to the control of other, household or domestic appliances.

According to one aspect disclosed herein, there is provided an apparatus comprising a (wired or wireless) transmitter for controlling one or more luminaires which (when on) illuminate at least part of an environment occupied by a user, and/or for controlling one or more domestic or office appliances available in the environment. For example, the environment may comprise a building in which different ones of the luminaires are located over different floors. The user terminal may take the form of a user terminal, preferably a mobile terminal such as a smartphone, tablet or laptop computer. The apparatus also comprises a controller configured to provide control functionality for controlling the luminaires via the transmitter, e.g. an application for controlling the lights via Wi-Fi, ZigBee or Bluetooth. The controller is configured to receive an altitude measurement from an altimeter disposed about the user's person, and based thereon to provide said control functionality in dependence on an altitude of the user relative to an altitude of each of the luminaires and/or appliances, e.g. in dependence on which floor of the building the user is on relative to which floors the luminaires and/or appliances are located on.

The apparatus may take the form of a mobile user terminal, and the altimeter may be incorporated internally in said user terminal. In embodiments, this user terminal incorporating the altimeter may be wearable, e.g. a smart-watch or smart-glasses with light control app and altimeter. Alternatively, the apparatus may comprise a mobile or static user terminal (comprising the transmitter and controller), with the altimeter being external to the user terminal. In this case, in embodiments the altimeter may be wearable.

In embodiments, the transmitter is for controlling a plurality of luminaires and/or domestic or office appliances. Said control functionality may comprise presenting the user, via a user interface of a user terminal, with a set of user-operable controls each enabling the user to control a respective one or more of the luminaires and/or appliances. In this case, said dependence on relative altitude comprises: presenting the user-operable controls in a manner representing relevance to the user according to how close the altitude of the user is to the altitude of the respective luminaires and/or appliances. I.e. one or more of the user-operable controls controlling luminaires and/or appliances closer to the user in altitude are presented as more relevant (e.g. more prominently) than one or more other of the user-operable controls controlling luminaires and/or appliances farther from the user in altitude. Put another way, the controls are prioritized according to their vertical proximity to the user.

For instance, the user-operable controls may be presented in a list, and the controller may be configured to represent the relevance of the user-operable controls by ordering the list in dependence on how close the altitude of the user is to the altitude of the respective luminaires and/or appliances. I.e. one or more of the user-operable controls controlling luminaires and/or appliances closer to the user in altitude are presented higher in the list than one or more other of the user-operable controls controlling luminaires and/or appliances farther from the user in altitude In one exemplary application, the environment is divided into a plurality of discrete levels, e.g. floors of a building, and said dependence on relative altitude comprises: providing the control functionality in dependence on which of the discrete levels (e.g. which floor) the user is located on relative to which of the levels (e.g. which floors) the luminaires and/or appliances are located on. E.g. the user-operable controls that control luminaires and/or appliances on the same floor as the user may be presented at the top of the list, or otherwise more prominently, than the other luminaires and/or appliances on different floors.

As an alternative use of the altimeter, instead of prioritizing the presentation of manual controls within the user-interface, said control functionality may comprise automatically controlling the luminaires and/or appliances, and said dependence on relative altitude may comprise performing the automatic control in dependence on the altitude of the user relative to an altitude of each of the luminaires and/or appliances. E.g. the controller may be configured to automatically turn on the lights on the same floor as the user, and automatically turn off the lights on floors not occupied by the user.

Optionally, the environment (e.g. building) may be divided into a plurality of zones (e.g. rooms) including zones on a same horizontal level, each zone comprising one or more of the luminaires and/or appliances; and the controller may be further configured to group the user-operable controls within the user interface according to the zones (e.g. rooms) of the respective luminaires and/or appliances. This may be achieved by incorporating one or multiple of the earlier specified localization techniques (e.g. RSSI or ToF).

In embodiments, the controller may be further configured, based on said altitude measurement, to determine a height of the altimeter within the level (e.g. floor) the user is located on; and to provide said control functionality in dependence on said height.

In embodiments, the controller may be configured to access a record of the altitude of each of the luminaires and/or appliances from a database, said provision of the control functionality in dependence on relative altitude being based thereon.

In further embodiments, the controller may be further configured to provide a commissioning function for use by the user, enabling the user to record the altitudes of the luminaires and/or appliances in said database by: indicating locations of the luminaires and/or appliances on a graphical map of the environment; or placing the altimeter at the altitude of each of the luminaires and/or appliances, and taking a corresponding measurement from the altimeter.

According to a further aspect disclosed herein, there may be provided a corresponding method comprising operations in accordance with any of the controller or system features disclosed herein. According to another aspect disclosed herein, there may be provided a corresponding computer program product comprising code embodied on a computer-readable storage medium, being configured to perform operations in accordance with any of the controller features disclosed herein.

BRIEF DESCRIPTION OF THE DRAWINGS

To assist understanding of the present disclosure and to show how embodiments may be put into effect, reference is made by way of example to the accompanying drawings in which:

FIG. 1 is a schematic diagram of an environment including a lighting system and user;

FIG. 2 is a schematic diagram of a user terminal communicating with an external altimeter and a luminaire;

FIG. 3 is a schematic diagram of a user terminal with internal altimeter, communicating with a luminaire;

DETAILED DESCRIPTION OF PREFERRED EMBODIMENTS

Figure 4:
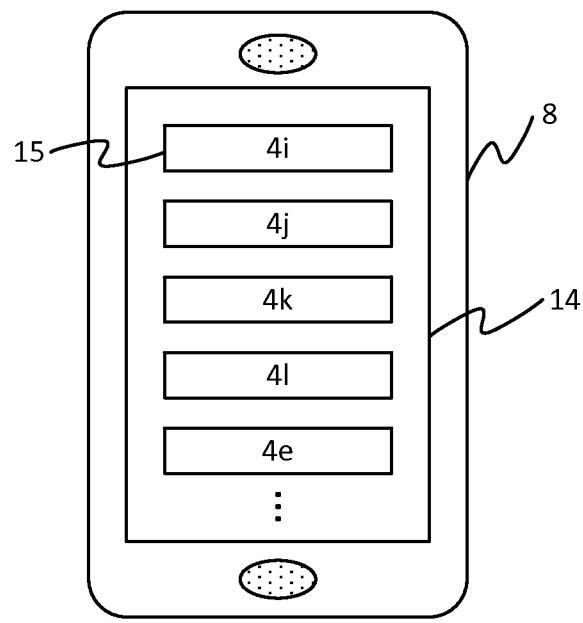
FIG. 4 is a schematic diagram of a user terminal with a plurality of user-operable controls being presented via a user interface of the user terminal.

Many of the electronic devices that surround us are becoming increasingly "connected", in that they are equipped with the ability to communicate with one another (whether directly or via a network). This means that different devices—potentially having different respective functionalities used for different diverse purposes—are able share information between them. Further, devices such as smart phones and tablets, and also wearable devices such as smart wristbands, smart watches and smart glasses, can be equipped with capabilities to sense information about the user, the device itself and/or its environment, and offer interaction capabilities that fit the context of use.

Lighting systems follow the same trend, with connected lighting systems increasing in popularity. For instance systems such as Philips' Hue are making it possible for people to control lighting in their houses through digital channels.

However, as the number of connected appliances grows, so does the complexity in controlling all these devices.

For example, in a lighting system the most relevant luminaires are not always at the top of a list of all luminaires that the user can control. One can imagine that with a low number of luminaires (say up to about five) control over all luminaires can be offered in a manner that is relatively straightforward for the user, but as soon as this number expands, it becomes undesirable to control all luminaires individually, or to search through a list of all known luminaires in the system. For example, a system supporting up to fifty luminaires will result in a long list of luminaires that are available to control, and if the user then wishes to select a specific luminaire then finding the particular control for this can be a cumbersome, time-consuming and/or dull procedure.

The possibility of grouping luminaires into scenes or by room simplifies the above to some extent. However, as the number of scenes or rooms in an environment increases, even this can become difficult to use.

To address such considerations, it would be desirable to order the controls, prioritizing those which control the luminaires most relevant to the user—i.e. so that the most readily-available interaction possibilities are those that are most appropriate for the user's current situation.

Enhancing user interfaces with location information (i.e. information about the current location of the user) can help to structure and simplify control for users. The following provides an elegant technique for determining information on the location of a user—in embodiments by means of wearable technology—and for ordering or otherwise prioritizing interaction possibilities for the user based on this determination. Particularly, an altimeter is used to determine the vertical location of the user compared with the luminaires. Based on the relative vertical location of the user, the controls for the luminaires on the same level as the user are then presented foremost in the user interface (e.g. first in a list). For example, a floor level in a home, office or the like (e.g., ground floor, first floor etc.) may be determined based on an altimeter sensor (e.g. in a bracelet or mobile phone the user carries), and the user interface may be arranged in such a way as to most prominently list or otherwise present those luminaires on the determined floor level (compared to luminaires on other floors).

FIG. 1 illustrates an example environment 2 in the form of a building, e.g. comprising one or more homes or company offices. The building 2 comprises a plurality of floors (storeys) 3, and a lighting system comprising a plurality of luminaires 4 installed or otherwise placed at various locations throughout the building 2 over at least some of the different floors 3. Each luminaire 4 comprises at least one light source (lamp), such as an array of LEDs, a gas discharge lamp or a filament bulb. The luminaires 4 are lighting devices which (when on) emit light with a suitable power and distribution for illuminating substantial parts of an environment such as a building that may be occupied by one or more users (humans), i.e. so that the users can find their way about and view objects in the environment (hence a luminaire is distinct from, say, an indicator light of an instrument display which only provides information and not substantive illumination).

In the illustrated example, the building 2 comprises three floors: a ground floor 3(0), a first floor 3(1) and a second floor 3(2) (note the floor numbering as used herein refers to the number of floors above ground). Twelve luminaires 4 are distributed over the three floors: three ceiling mounted luminaires 4a, 4b, 4c and one free-standing luminaire 4d on the ground floor 3(0); three ceiling mounted luminaires 4e, 4f, 4g and one free-standing luminaire 4h on the first floor 3(1); and three ceiling mounted luminaires 4i, 4j, 4k and one free-standing luminaire 4i on the second floor 3(2). Of course it will be appreciated that this is only by way of example, and different numbers of luminaires over different numbers of floors are also possible.

The building 2 is occupied by a (human) user 6, who at any given time may be located on any one of the floors 3 (or at least some of the floors 3). The user 6 is in possession of or has access to a user terminal 8. In embodiments the user terminal 8 is a mobile user terminal which the user 6 carries about his or her person, e.g. being held, worn, or stowed in a pocket or bag. For example the user terminal 8 may take the form of a smartphone, tablet, laptop, smart-watch or smart-glasses. Alternatively it is not excluded that the user terminal 8 is a static terminal such as a desktop computer or dedicated lighting control terminal (e.g. wall panel), but where the location of the user 6 is still an unknown (e.g. the static terminal is one of a number of such terminals placed around the building, and no record of the terminal locations is available).

Referring also to FIGS. 2 and 3, the user terminal 8 comprises a transmitter 18 for communicating with the luminaires 4, at least for the purpose of transmitting control signals to the luminaires 4. In embodiments, the transmitter 18 may also be accompanied on the user terminal 8 by a receiver for receiving acknowledgements and/or status reports back from the respective luminaires 4 in response to the control signals, though this is not essential in all possible embodiments. In the following the transmitting component 18 will be referred to as a transceiver for both transmitting and receiving, but it will be appreciated that the minimum is a transmitter.

The transceiver 18 may be configured to conduct these communications via a wireless technology, e.g. an RF technology such as Wi-Fi, ZigBee or Bluetooth; or a wired technology such as Ethernet or DMX; or any combination of these. The communications may be transmitted via one or more intermediate terminals 12, such as a wireless router and/or a central control unit of the luminaires 4. Alternately the described communications may be transmitted directly between the user terminal 8 and the luminaires 4, e.g. via a direct wireless connection between the user terminal 8 and each of the luminaires 4, with no need for an intermediate unit 12 such as a central controller or router.

By way of illustration, in one example lighting system there is no central control unit of the system, and each of the luminaires 4 comprises its own local control unit and wireless receiver. The controller 16 on the user terminal 8 uses its transceiver 18 to transmit the lighting control signals directly to the desired luminaires 4 via a direct wireless connection with each of their respective receivers, e.g. a ZigBee or Bluetooth connection, or even via an ad-hoc or peer-to-peer route relayed wirelessly via one or more others of the luminaires 4 and/or other user terminals. As a variant of this, the control controller 16 on the user terminal 8 transmits the lighting control signals to the desired luminaires 4 via an intermediate unit 12 in the form of a wireless router, e.g. a Wi-Fi router, which relays the signals but is not itself a control unit of the lighting system per se.

In an alternative example lighting system, the lighting system comprises an intermediate unit 12 in the form of a central control unit. The controller 16 on the user terminal 8 transmits the lighting control signals to the central control unit 12, which forwards the lighting control signals onward to the relevant luminaires 4. E.g. this could be performed via a wireless connection (e.g. Wi-Fi, ZigBee or Bluetooth) between the user terminal 8 and the control unit 12, and a wireless or wired infrastructure between the control unit 12 and luminaires 4 (e.g. Ethernet or DMX). The lighting control signals as forwarded from the central control unit 12 to the luminaires 4 may take a different form than when transmitted from the user terminal 8 to the central control unit 12. The forwarding may be conditional on one or more conditions applied by the central control unit 12, e.g. the central control unit 12 may perform an authentication to verify the identity of the user 6 before allowing him or her to control the lights, and/or may perform an arbitration to arbitrate between potentially conflicting control requests from other users.

For the sake of conciseness the various options will not be repeated each time, but it will be understood that any of the communications described herein may be performed by any such means as discussed above.

On the user terminal 8, the controller 16 is operatively coupled to the transceiver 18, and is configured to control the luminaires 4 by generating the lighting control signals and outputting them for transmission to the respective luminaires 4 via the transceiver 18. The controller 16 may be implemented in the form of software embodied on one or more computer-readable storage media (e.g. a magnetic medium such as a hard disk, or an electronic medium such as an EEPROM or "flash" memory) and arranged to be executed on one or more processors of the user terminal 8. E.g. in embodiments the controller 16 takes the form of a lighting control application running on the user terminal 8. However, it is not excluded that the controller 16 could alternatively be implemented in dedicated hardware circuitry, or configurable or reconfigurable circuitry (e.g. PGA or FPGA), or any combination of software and hardware.

By whatever means implemented, the controller 16 on the user terminal 8 is also configured to receive an altitude measurement from an altimeter 10. An altimeter, as referred to herein, is an instrument comprising a sensing modality dedicated to detecting altitude relative to the Earth (as opposed to a positioning system that measures 3D position generally using a 3D location network such as an indoor location network or satellite-based positioning network like GPS). In embodiments, the altimeter comprises an atmospheric pressure sensor configured to determine the altitude measurement based on sensing atmospheric pressure.

As illustrated in FIGS. 1 and 2, the altimeter 10 may be external to the user terminal 8, i.e. with a separate housing and not being mechanically connected to the user terminal 8. For example the altimeter may be a wearable altimeter, e.g. taking the form of a watch or wristband, an armband, a waistband or a headband, or incorporated into a piece of clothing. The term wearable as used herein may refer to any device having a form designed for attaching, hanging or otherwise supporting the device from the human body (e.g. comprising a strap or elastic, or a garment shaped to fit over one or more a body parts) or for attaching to another item of clothing (e.g. comprising a clip or pin).

In the case of an external altimeter 10, the controller 16 is configured to receive the altitude measurement from the altimeter, preferably via a wireless connection such as a Wi-Fi, ZigBee or Bluetooth connection (though it is not excluded that the altitude measurement could be received via a wired connection in the form of a flexible cable between the altimeter 10 and the user terminal 8). In embodiments, the altitude measurement is received via the same transceiver 18 that is used to communicate with the luminaires 4, or alternatively the user terminal 8 may be equipped with a different transceiver (or at least receiver) which it uses to receive the altitude measurement. Either way, similar options to those discussed in relation to the luminaires 4 are possible for the connection with the altimeter 10 (i.e. direct connection or connection via one or more intermediate terminals 12 such as a wireless router, etc.).

Alternatively, the altimeter 10 may be incorporated in the same user terminal 8 as the controller 16, i.e. within the same housing, the controller 16 being arranged to receive the altimeter measurement via an internal connection. In this case user terminal 8 is a mobile user terminal, and in embodiments may be wearable, e.g. a smart-watch or a pair of smart-glasses.

Whether the altimeter 10 is internal or external to the user terminal 8, the altitude measurement it provides enables the controller 16 on the user terminal 8 to determine the current altitude of the user. In embodiments, the altitude measurement received from the altimeter 10 specifies the altitude of the altimeter on a substantially continuously-variable scale (as far as is possible in a digital system), e.g. representing the altitude of the altimeter in meters above the ground. In this case the controller 16 on the user terminal 8 may be configured to determine the altitude of the user in terms of floor number, by converting the altitude measurement from the continuously-variable scale, e.g. from meters to floor number. Alternatively it is not excluded that the altimeter 10 could be calibrated to output the altitude measurement already represented in terms of floor number, in which case the controller 16 on the user terminal 8 is able to determine the altitude of the user 6 just by reading the floor number of the altimeter 10 from the altimeter 10.

Further, the controller 16 is configured to determine the altitude of each of the luminaires 4. In embodiments, it is configured to do this by looking up each of the luminaires 4 in a database 11 mapping respective IDs (e.g. addresses) of the luminaires to their respective altitude, either in terms of floor number or a value on a (substantially) continuously-variable scale (e.g. in meters) which the controller 16 converts to floor number. Note that luminaires usually have fixed altitude. Optionally the database may also specify a respective name for each of the luminaires 4. In embodiments, the altitude of each of the luminaires 4 may be obtained by looking up an altitude, e.g. in units of floor number, mapped individually to each of the luminaires 4. I.e. the controller 16 queries the database 11 with an ID of each luminaire 4 and receives back an indication of the corresponding altitudes. For example:

| Luminaire ID | Altitude (floor no.) | Luminaire name |
|---|---|---|
| 4a | 0 | "Ground floor ceiling west" |
| 4b | 0 | "Ground floor ceiling center" |
| 4c | 0 | "Ground floor ceiling east" |
| 4d | 0 | "Ground floor, free-standing 1" |
| 4e | 1 | "First floor ceiling west" |
| 4f | 1 | "First floor ceiling center" |
| 4g | 1 | "First floor ceiling east" |
| 4h | 1 | "First floor free-standing 1" |
| 4i | 2 | "Second floor ceiling west" |
| 4j | 2 | "Second floor ceiling center" |
| 4k | 2 | "Second floor ceiling east" |
| 4l | 2 | "Second floor, free-standing 1" |

Alternatively an indication of the altitude of each of the luminaires 4 could be obtained by looking up a set of luminaires mapped to floor number. I.e. the controller 16 queries the database 11 with a floor number and receives back an indication of which one more luminaires 4 are located on that floor. For example:

| Altitude (floor no.) | Luminaire IDs | Group name |
|---|---|---|
| 0 | 4a, 4b, 4c, 4d | "Ground floor" |
| 1 | 4e, 4f, 4g, 4h | "First floor" |
| 2 | 4i, 4j, 4k, 4l | "Second floor" | or:

| Altitude (floor no.) | Luminaire address range | Group name |
|---|---|---|
| 0 | 4a to 4d | "Ground floor" |
| 1 | 4e to 4h | "First floor" |
| 2 | 4i to 4l | "Second floor" | or in variants of the above the database 11 could specify heights of luminaires on a (substantially) continuously-variable scale (e.g. in meters or centimeters), and the controller 16 converts this to floor number.

The database 11 may take the form of any suitable data structure from a small look-up table to a large database. It may be implemented on an internal data store within the user terminal 8, and/or an external data store external to the user terminal 8. In the case of an external data store, the controller 16 is configured to query the database 11 via a suitable connection with the external data store, preferably via a wireless connection such as a Wi-Fi, ZigBee or Bluetooth connection (though a wired connection is not excluded). In embodiments, the database 11 is queried via the same transceiver 18 that is used to communicate with the luminaires 4, or alternatively the user terminal 8 may be equipped with a different transceiver which it uses to query the database 11. Either way, similar options to those discussed in relation to the luminaires 4 are possible for the connection with the database 11 (i.e. direct connection or connection via one or more intermediate terminals 12 such as a wireless router, etc.). Further, the data store storing the database 11 may be stored locally in the environment 2 or remotely. For instance, in embodiments the database 11 may be stored on server of a local area network of the environment 2, and the controller 16 may be configured to access the database 11 wirelessly via the transceiver 18 and a wireless router 12 of the local area network; or in other embodiments the database 11 may be stored on server of a wide area network such as the Internet or a mobile cellular network, and the controller 16 may be configured to access the database 11 wirelessly via the transceiver 18 and a wireless access point 12 connecting to the wide area network. Note also that the data store storing the database 11 may be implemented in a single storage unit (e.g. a single server unit) or distributed over multiple storage units (e.g. multiple server units) across one or more geographical sites.

As another alternative, rather than looking up the altitudes of the luminaires 4 in a database 11, the luminaires 4 could be equipped with built-in altimeters as well, and could transmit indications of their own current altitude to the controller 16. E.g. although in most scenarios luminaires 4 have fixed altitudes, this could accommodate for a system in which the luminaires 4 can potentially have varying altitudes.

In operation, the controller 16 is configured to offer the user 6 interaction possibilities that are tailored towards his or her current context of use, and therefore simplifies interaction with the lighting system.

The controller 16 uses the altimeter 10 to determine the current location of the user 6, expressed as the floor 3 of the building 2 on which the user 6 is currently located, e.g. ground floor, second floor, etc. Further, the distribution of the luminaires 4 throughout the building is also known, where the location of each luminaire 4 may also be expressed by the floor 3 of the building 2. The controller 16 is configured to use this information to compare the current altitude of the user 6 with the altitude of each of the luminaires 4 in the system, and thus determine the vertical proximity of the user 6 relative to each of the luminaires 4a.

Figure 5:
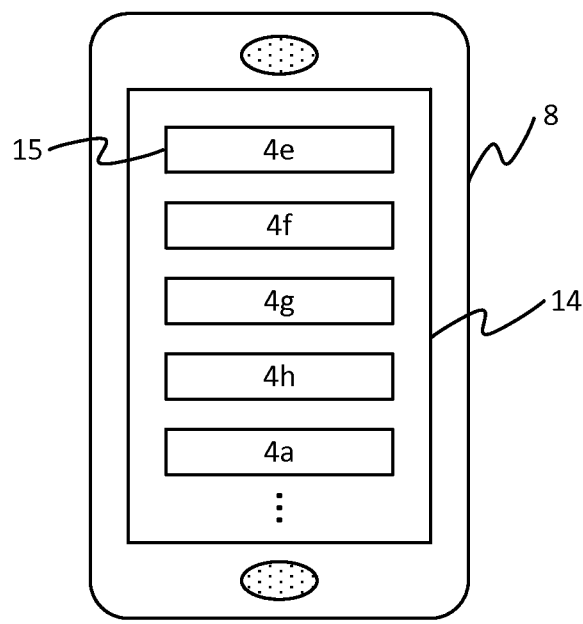
FIG. 5 is another schematic diagram of a user terminal with a plurality of user-operable controls presented via its user interface.

Furthermore, referring to FIGS. 4 and 5, the controller 16 is configured to present the user with a plurality of user-operable controls 15 via a user-interface 14 of the user terminal 8 (e.g. a graphical or text-based user interface presented on a screen of the user terminal 8). Each control 15, when activated by the user 6, operates a respective one of the luminaires 4, or a respective group of the luminaires 4 (e.g. all the luminaires on a given floor or in a given room). For example, the control may allow the user to turn the respective luminaire(s) 4 on or off, dim it/them up or down, change the color of the emitted light, and/or request status information from the respective luminaire(s) 4.

Based on the location of the user 6 (in terms of which floor the user 6 is on relative to the luminaires 4), the controller 16 is configured to present the controls 15 of those luminaires 4 that are located nearest to the user 6 (i.e. on the same floor) with a higher priority and ordered first in the user interface 14, whereas the controls 15 of those luminaires 4 further away (on different floors) have a lower priority and are ordered lower in the user interface 14. Thus the controller 16 organizes the control of the luminaires 14 within the user interface. Luminaires 4 that share the (vertical) location of the user 6 are ranked higher up on the user interface 14 (e.g. higher in a list), and the further away the luminaires 4 are, the lower their rank. Luminaires 14 with the highest rank are the first ones accessible in the user interface 14.

For the user 6, this ensures that he or she has easy access to the lamps that are relevant to his or her situation, as the system prioritizes them for him. This simplifies the selection of the desired luminaire(s) 4 and reduces the time and effort required to find the control options 15 for that luminaire or group of luminaires.

For instance, referring to the illustrated example of FIG. 1 in conjunction with FIGS. 4 and 5, if the user 6 is located on the second floor 3(2) then the controller 16 will detect this and determine that the user 6 is on the same floor as luminaires 4i, 4j, 4k and 4l. Based on this determination, it may then present the user-operable controls 15 for luminaires 4i, 4j, 4k, 4l at the top of the list of controls—see FIG. 4. Optionally the controls 15 for the other luminaires 4a-4h could also be ordered according to the degree of difference between their respective altitude and that of the user 6, i.e. so luminaires on adjacent floors are listed next down the list, etc.; or alternatively the controller 16 could just present the controls 15 for luminaires on the same floor first, with no particular order to those on other floors.

If the user 6 then goes down a flight of stairs to the first floor 3(1), then the controller 16 will detect this and determine that the user 6 is on the same floor as luminaires 4e, 4f, 4g and 4h. Based on this determination, it may now present the user-operable controls 15 for luminaires 4e, 4f, 4g, 4h at the top of the list of controls—see FIG. 5.

Note that in embodiments, the disclosed technique is not limited to ranking the most vertically proximate luminaires 4 at the top of a list of controls 15. In other embodiments, there are other ways making the controls 15 for the most vertically proximate luminaires 4 more prominent or highly prioritized, e.g. by highlighting the controls 15 for the luminaires 4 on the same floor 4 as the user 6, or presenting them in a separated menu.

In further embodiments, the interaction can be extended if the altimeter is precise to a finer resolution than the spacing of the floors 3, such that its altitude measurement enables the controller 16 to determine the height of the altimeter within the current floor 3. For instance, the altimeter 10 or the user terminal 8 in which it is housed (in the case of an internal altimeter) may be wearable and attached to a limb of the user 6 (e.g. by a wrist band), or may be held in a hand of the user 6. The altitude measurement from the altimeter 10 thus allows the controller 16 to determine not only what floor 3 the user 6 is on, but also the height of his or her limb or a particular part of the limb such as the hand. Further, if the controller 16 is also able to determine the heights of the luminaires 4 to a finer resolution than which floor they are on (e.g. this also being stored in the database 11) then it can determine the height of the user's hand or limb compared to the height of the luminaires 4 on the same floor 3. Then by the user 6 moving his or her limb or hand, the controller 16 can prioritize the luminaires 4 that are located at a corresponding height. E.g. moving the hand up would select ceiling lamps, holding a hand on the level of the table lamp(s) will select table lamp(s), etc.

In further embodiments, the luminaires 4 may additionally be grouped by zones in the horizontal plane of each floor 3, e.g. the zones being different rooms or corresponding to different lighting scenes. For example, the database 11 may also store information as to which zone each of the luminaires 4 belongs, and the controller 16 may determine the groupings by querying the database 11. The controller 6 may then present the controls 15 for the luminaires 4 grouped according to their zones.

In certain implementations of such a case, instead of displaying individual luminaire names or IDs the controller 6 may only display names of the groups. Moreover, the order of the groups or scenes in the user interface 14 may be based on the order of individual luminaires 4 in each group, e.g. the user interface 14 will display first the group that contains the luminaire 4 closest (vertically) to the user 6, or alternatively the groups may be ordered according to an "average" altitude associated with each group.

In some embodiments, the controller 16 may also be configured to adapt based on the horizontal position of the user 6 relative to the horizontal positions of the luminaires 4. For example, the controller 16 may determine the horizontal position of the user 6 from an indoor location network or a satellite-based positioning network such as GPS, or by other means such as coded light. For instance, the controller 16 may priorities the controls 15 first based on altitude and then based on horizontal position, e.g. to priorities the controls 15 first based on floor 3 then horizontal proximity to the user within that floor. For example amongst a set of controls 15 for the luminaires 4 on the same floor as the user 6, presented at the top of the list, then within that top set the controls 15 could be grouped according to their zone (e.g. room or scene), with the luminaires 4 in the same zone as the user 6 being presented at the very top of the list (or generally more prominently than the other luminaires 4 on the same floor 3).

Thus the disclosed techniques may optionally be extended by additional location information. For example, the distribution of luminaires 4 in specific rooms may be part of the categorization. Detection of rooms may be achieved through coded light techniques (a unique ID embedded invisibly in the light emitted by the different luminaires 4), or via intelligent beacons, or via wireless signal strength detection, or a combination of such technologies. The listing can then be extended by lamps that are not only vertically close to the user as well as horizontally.

In yet further embodiments, the controller 16 may also be configured to provide commissioning functionality for initially assigning a location to each of the luminaires 4 prior to use of the system, and/or to update the locations—i.e. to assign the vertical position in terms of floor, and in embodiments any associated horizontal positioning information such as room or zone. In embodiments, the controller 16 provides this functionality via the same user interface 14 as that through which it presents the user-operable controls 15 allowing the user 6 to control the luminaires 4. For example, at the time of installation or to update the system, the controller 16 may enable the user 6 to specify which luminaires 4 are at which locations by dragging and dropping icons representing the luminaires 4 onto a map of the building 2 (e.g. house or office), or alternatively the user enters a number for the floor the luminaire 4 is located. This can also be part of the naming process for each luminaire 4 during installation or updates.

Note that the information on the user's location acquired through the altimeter 10 and any horizontal positioning technology are represented within the same location-framework as the luminaires 4, so the floor plan relative to which the user 6 is located will be the same or equivalent to the luminaire floor plan.

In a variant, instead of manual commissioning, the controller 16 may be configured to support commissioning of the luminaires 4 a semi-automatic way using measurements from the altimeter 10—i.e. the same altimeter 10 that is used to detect the current location of the user 6 can also be used to store the altitudes of the luminaires during installation or updates to the system. In this case, when a new luminaire 4 is installed, the user 6 can register it by moving the altimeter 10 (e.g. worn in a wearable device) close to the luminaire 4 in question. As a result of this action, the controller 16 detects the altitude based on the measurement by the altimeter 10 and associates this with the newly-installed luminaire 4, e.g. by storing it in the database 11 in terms of floor number and optionally also height within the floor. Thus the system detects and automatically stores the current floor 3 when the user 6 installs a luminaire 4. In this case the floor plan is not essential as the luminaires 4 can be automatically grouped based on their altitude relative to the ground and the average height of the ceiling (to avoid grouping of ceiling luminaires on one floor with floor luminaires on the next floor).

It will be appreciated that the above embodiments have been described only by way of example.

For instance, the techniques disclosed above are not limited to the home, and may also be applied in other lighting domains such as offices, hospitality etc. Further, the techniques disclosed above are not only applicable in relation to floors of a building, but can be applied in relation to any environment divided into discrete levels, e.g. levels of a levelled garden, levels of a ship, or levels in a system of scaffolding.

As another alternative, the altitude measurement 10 may output the altitude on a continuously-variable scale and the controller 16 on the user terminal 8 may configured to continue to work on a (substantially) continuously-variable scale without conversion to discrete floor number or discrete level. In this case it determines the altitudes of the luminaires 4 on a continuously-variable scale (e.g. by querying the database 11 which may store their altitudes in such a form), and compares them with the altitude of the user 6 on a continuously-variable scale. The controller 16 may then prioritize the corresponding user-operable controls 15 within the user interface 14 in order of the quantified difference between the user's altitude and the altitude of the luminaires 4 on a continuously variable scale. E.g. the controller may compare the user's altitude in meters or centimeters to the altitude of each of the luminaires 4 in meters or centimeters, and order the controls 15 in a list according to the difference in meters or centimeters. Note again that the inherent quantization of a value due to representation in digital electronics is not considered sufficiently coarse to be considered "discrete" for the purpose of the present disclosure.

Further, the scope of the disclosure is not limited to prioritizing controls according to relevance. In alternative embodiments the controller 16 may be configured to automatically control the luminaires 4 based on the user's altitude, e.g. to automatically turn on the lights on the same floor 3 as the user 6 and to turn off the lights on other floors 3.

Further, the techniques disclosed above may be applied to other applications beyond lighting, e.g. to the control of: audio and/or video appliances or other small or large household appliances such as TVs, DVS players, set-top boxes, washing machines, dishwashers, etc.; and/or office appliances such as printers, scanners, photocopiers, fax machines, etc. For example, user-operable controls 15 for controlling such appliances may be offered if they are applicable to the user's current location.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or an does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored and/or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An apparatus comprising:
a transmitter for controlling one or more luminaires which illuminate at least part of an environment occupied by a user, and/or controlling one or more domestic or office appliances available in said environment; and
a controller configured to provide control functionality for controlling the luminaires and/or appliances via the transmitter;
wherein the controller is configured to receive an altitude measurement from an altimeter disposed about the user's person and to perform an assessment, based on said measurement, of a proximity of an altitude of the user to an altitude of each of the luminaires and/or appliances, and based on the assessment to provide said control functionality in dependence on the altitude of the user relative to the altitude of each of the luminaires and/or appliances.

2. The apparatus of claim 1, wherein: said control functionality comprises automatically controlling the luminaires and/or appliances, and said dependence on relative altitude comprises performing the automatic control in dependence on the altitude of the user relative to an altitude of each of the luminaires and/or appliances.

3. The apparatus of claim 1, wherein:
the environment is divided into a plurality of discrete levels,
said dependence on relative altitude comprises: providing the control functionality in dependence on which of the discrete levels the user is located on relative to which of the levels the luminaires and/or appliances are located on.

4. The apparatus of claim 3, wherein the environment comprises a building and said levels are floors of the building.

5. The apparatus of claim 3, wherein the controller is further configured, based on said altitude measurement, to determine a height of the altimeter within the level the user is located on, and to provide said control functionality in dependence on said height.

6. The apparatus of claim 1, wherein the controller is configured to access a record of the altitude of each of the luminaires and/or appliances from a database, said provision of the control functionality in dependence on relative altitude being based thereon; and wherein the controller is further configured to provide a commissioning function for use by the user, enabling the user to record the altitudes of the luminaires and/or appliances in said database by:
indicating locations of the luminaires and/or appliances on a graphical map of the environment; or
placing the altimeter at the altitude of each of the luminaires and/or appliances, and taking a corresponding measurement from the altimeter.

7. The apparatus of claim 1, wherein said apparatus is a mobile user terminal and the altimeter is incorporated internally in said user terminal.

8. The user terminal of claim 7, wherein the user terminal is wearable.

9. The apparatus of claim 1, wherein said apparatus comprises a user terminal comprising the transmitter and controller, and the altimeter is external to the user terminal.

10. A system comprising the user terminal of claim 9 and the external altimeter, wherein the altimeter is wearable.

11. The apparatus of claim 1, wherein said control functionality comprises presenting the user, via a user terminal, with a set of user-operable controls each enabling the user to control a respective one or more of the luminaires and/or appliances, the user-operable controls being presented in a manner representing relevance to the user according to how close the altitude of the user is to the altitude of the respective luminaires and/or appliances.

12. The apparatus of claim 11, wherein the user-operable controls are presented in a list, and the controller is configured to represent the relevance of the user-operable controls by ordering the list in dependence on how close the altitude of the user is to the altitude of the respective luminaires and/or appliances.

13. The apparatus of claim 11, wherein the transmitter is for controlling a plurality of luminaires and/or domestic or office appliances;
the environment comprises a plurality of zones including zones on a same horizontal level, each zone comprising one or more of the luminaires and/or appliances; and and the controller is further configured to group the user-operable controls within the user interface according to the zones of the respective luminaires and/or appliances.

14. A method of controlling one or more luminaires which illuminate at least part of an environment occupied by a user, and/or controlling one or more domestic or office appliances available in said environment; the method comprising:
using control functionality of an apparatus to control the luminaires and/or appliances via a transmitter of the apparatus;
receiving an altitude measurement from an altimeter disposed about the user's person; and
performing an assessment, based on the altitude measurement from the altimeter, of a proximity of an altitude of the user to an altitude of each of the luminaires and/or appliances, wherein said control functionality, based on said assessment, is dependent on the altitude of the user relative to the altitude of each of the luminaires and/or appliances.

15. The method of claim 14, wherein said control functionality comprises presenting the user, via a user terminal, with a set of user-operable controls each enabling the user to control a respective one or more of the luminaires and/or appliances, the user-operable controls being presented in a manner representing relevance to the user according to how close the altitude of the user is to the altitude of the respective luminaires and/or appliances.

16. A computer program product for controlling one or more luminaires which illuminate at least part of an environment occupied by a user, and/or controlling one or more domestic or office appliances available in said environment; the computer program product comprising code embodied on a non-transitory computer-readable storage medium and configured, when executed, to perform operations of:
providing control functionality for controlling the luminaires and/or appliances via a transmitter;
receiving an altitude measurement from an altimeter disposed about the user's person;
performing an assessment, based on the altitude measurement from the altimeter, of a proximity of an altitude of the user to an altitude of each of the luminaires and/or appliances; and
based on the assessment, providing said control functionality in dependence on the altitude of the user relative to the altitude of each of the luminaires and/or appliances.

17. The computer program product of claim 16, wherein providing said control functionality comprises presenting the user, via a user terminal, with a set of user-operable controls each enabling the user to control a respective one or more of the luminaires and/or appliances, the user-operable controls being presented in a manner representing relevance to the user according to how close the altitude of the user is to the altitude of the respective luminaires and/or appliances.

\* \* \* \* \*